(12) United States Patent
Horng

(10) Patent No.: US 9,006,944 B2
(45) Date of Patent: Apr. 14, 2015

(54) MOTOR WITH A DEFORMABLE LIMITING MEMBER

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 342 days.

(21) Appl. No.: 13/365,309

(22) Filed: Feb. 3, 2012

(65) Prior Publication Data

US 2013/0106221 A1    May 2, 2013

(30) Foreign Application Priority Data

Nov. 1, 2011    (TW) .............................. 100139807 A

(51) Int. Cl.

| H02K 7/00 | (2006.01) |
|---|---|
| H02K 7/08 | (2006.01) |
| F16C 32/06 | (2006.01) |
| F04D 25/08 | (2006.01) |
| H02K 1/18 | (2006.01) |
| H02K 5/167 | (2006.01) |

(52) U.S. Cl.
CPC .............. *H02K 1/187* (2013.01); *H02K 5/1675* (2013.01); *H02K 7/085* (2013.01); *H02K 2213/03* (2013.01)

(58) Field of Classification Search
CPC ............. H02K 7/08; H02K 7/14; F16C 32/06
USPC ........... 310/67 R, 90; 384/100, 119; 417/354; 360/99.08
See application file for complete search history.

(56) References Cited

U.S. PATENT DOCUMENTS

| 5,610,462 | A | 3/1997 | Takahashi |
| 6,376,946 | B1 * | 4/2002 | Lee .............................. 310/67 R |
| 2008/0169733 | A1 * | 7/2008 | Lin et al. ...................... 310/67 R |
| 2009/0261672 | A1 * | 10/2009 | Horng et al. .................... 310/90 |
| 2009/0309437 | A1 | 12/2009 | Horng et al. |
| 2009/0309438 | A1 * | 12/2009 | Horng et al. .................... 310/90 |
| 2010/0127588 | A1 * | 5/2010 | Horng .............................. 310/90 |

FOREIGN PATENT DOCUMENTS

TW    M337015    7/2008

* cited by examiner

*Primary Examiner* — Tran Nguyen
*Assistant Examiner* — Jose Gonzalez Quinones
(74) *Attorney, Agent, or Firm* — Alan Kamrath; Kamrath IP Lawfirm, P.A.

(57) ABSTRACT

A motor includes a base, a rotor and a stator. The base includes a shaft tube having an open end and a closed end. A shaft supporting assembly is received in the shaft tube and includes a top portion. The rotor includes a shaft rotatable about a longitudinal axis, and the shaft includes a retaining groove. The stator includes a limiting member having a distal end. The limiting member defines an opening through which the shaft extends. The limiting member further includes a bottom facing the shaft supporting assembly. A gap and a supporting member are formed between the bottom and the top portion. The supporting member is closer to the shaft tube than to the shaft, and the gap is closer to the shaft than to the shaft tube.

12 Claims, 8 Drawing Sheets

US 9,006,944 B2

MOTOR WITH A DEFORMABLE LIMITING MEMBER

BACKGROUND OF THE INVENTION

1. Field of the Invention

The present invention relates to a motor and, more particularly, to a motor with prevention of disengagement of a rotor thereof.

2. Description of the Related Art

FIG. 1 shows a conventional motor 8 with prevention of disengagement of a rotor thereof disclosed by Taiwan Patent No. M337015. Specifically, the motor 8 includes a bracket 81 having a bearing holder 811. A sleeve bearing 812, a washer 813 and a cross retaining ring 814 are received in the bearing holder 811. A stator 82, an upper insulating sleeve 83 and a lower insulating sleeve 84 are mounted around the bearing holder 811. The sleeve bearing 812 rotatably receives a rotating shaft 851 of a rotor 85. The rotating shaft 851 has an outer surface that forms a retaining groove 852 in which the cross retaining ring 814 is retained to prevent disengagement of the rotor 85. Further, the washer 813 is provided under the cross retaining ring 814. The upper insulating sleeve 83 includes a retaining ring 831 that presses against the cross retaining ring 814, allowing the cross retaining ring 814 to be retained between the retaining ring 831 and the washer 813 to prevent the cross retaining ring 814 from escaping from the bearing holder 811.

However, the motor 8 requires additional components (such as the cross retaining ring 814) to prevent disengagement of the rotor 85, and it is necessary to form the retaining ring 831 on the upper insulating sleeve 83 to press and retain the cross retaining ring 814. As a result, not only the structural complexity and component quantity but also assembly complexity of the motor 8 is increased, leading to an inconvenient assembly.

Furthermore, although the washer 813 under the cross retaining ring 814 may press and retain the sleeve bearing 812, the space between the cross retaining ring 814 and the top of the sleeve bearing 812 is limited. As a result, when the rotating shaft 851 is forced through the cross retaining ring 814 during assembly of the motor 8, little space is provided for deformation of the cross retaining ring 814 due to the limited space between the cross retaining ring 814 and the top of the sleeve bearing 812. In other words, although some space exists between the cross retaining ring 814 and the top of the sleeve bearing 812, the space is not big enough to allow deformation of the cross retaining ring 814 when the cross retaining ring 814 is deformed by the rotating shaft 851 passing through the cross retaining ring 814. Thus, the cross retaining ring 814 may be damaged or broken, leading to an inconvenience in assembly.

FIG. 2 shows another conventional rotor 9 with prevention of disengagement of a rotor thereof. Specifically, the motor 9 includes a housing 91 having a shaft tube 911 receiving a bearing 912 that rotatably receives a shaft 921 of a rotor 92. The shaft 921 includes an annular groove 922 in an outer periphery thereof. A stator unit 93 is mounted around the shaft tube 911 and includes an insulating sleeve 931 having an inner periphery on which a plurality of limiting members 932 is formed. The limiting members 932 retain the bearing 912 and extend into the annular groove 922 to prevent disengagement of the rotor 92. An example of such a motor is disclosed in Taiwan Patent Application No. 97121722.

Compared to the motor 8 that must include the cross retaining ring 814 to prevent disengagement of the rotor 85, the motor 9 directly uses the stator unit 93 that is necessary for driving the rotor 92 to form the limiting members 932 for the purposes of preventing disengagement of the rotor 92, simplifying the structure of the motor 9. Specifically, motor 9 directly uses the insulating sleeve 931 formed on the stator unit 93 to form the limiting members 932 for the purposes of preventing disengagement of the rotor 92.

However, the limiting members 932 directly press against the bearing 912. Namely, no gaps exist between the limiting members 932 and the bearing 912. In assembly, the shaft 921 of the rotor 92 must be forcibly inserted through an opening defined by the limiting members 932 before engagement with the bearing 912. Since no gaps exist between the limiting members 932 and the bearing 912, the limiting members 932 and the bearing 912 could not provide any space for deformation of the limiting members 932. Thus, the limiting members 932 are liable to damage or break when the shaft 921 presses the limiting members 932 into the annular groove 922, resulting in an inconvenience in assembly.

SUMMARY OF THE INVENTION

An objective of the present invention is to provide a motor without the disadvantages of the conventional rotors by directly forming the limiting member on the insulating sleeve of the stator to prevent disengagement of the rotor, effectively simplifying the structure of the motor.

Another objective of the present invention is to provide a motor preserving a space that allows deformation of the limiting member, effectively avoiding damage or breakage of the limiting member during assembly of the motor.

The present invention fulfills the above objectives by providing a motor including a base, a rotor and a stator. The base includes a shaft tube having an open end and a closed end. A shaft supporting assembly is received in the shaft tube and includes a top portion facing the open end. The rotor includes a shaft supported by the shaft supporting assembly and rotatable about a longitudinal axis. The shaft includes a retaining groove. The stator is coupled to the shaft tube of the base. The stator includes at least one limiting member having a distal end facing the shaft. The at least one limiting member defines an opening through which the shaft extends to engage with the shaft supporting assembly. The distal end of the at least one limiting member is received in the retaining groove of the shaft and prevents disengagement of the shaft from the shaft supporting assembly. The at least one limiting member further includes a bottom facing the shaft supporting assembly. A gap and a supporting member are formed between the bottom of the at least one limiting member and the top portion of the shaft supporting assembly. The supporting member is closer to the shaft tube than to the shaft, and the gap is closer to the shaft than to the shaft tube. The gap provides a space for deformation of the at last one limiting member, so that the distal end of the at least one limiting member extends into the retaining groove of the shaft.

In a form shown, a maximum radial distance is defined between an outer periphery of the shaft and an inner circumferential wall of the shaft tube in a radial direction of the shaft. A reference plane parallel to the longitudinal axis and passing through a central point of the maximum radial distance is defined. The supporting member is located between the reference plane and the inner circumferential wall of the shaft tube. Only the gap is presented between the reference plane and the outer periphery of the shaft.

In a form shown, the supporting member is integrally formed on the bottom of the at least one limiting member or on the top portion of the shaft supporting assembly. Alternatively, the supporting member is a detachable component capable of being assembled to and disassembled from the bottom of the at least one limiting member or the top portion of the shaft supporting assembly.

In a form shown, the shaft supporting assembly includes a bearing having a through-hole. The shaft of the rotor is rotatably received in the through-hole of the bearing. The top portion of the shaft supporting assembly is an end face of the bearing that faces the open end of the shaft tube.

In the form shown, a radial length is presented between the distal end of the at least one limiting member and an inner periphery of the through-hole of the bearing in a radial direction of the shaft perpendicular to the longitudinal axis. The radial length is smaller than or equal to the gap along the longitudinal axis.

In the form shown, the stator includes an insulating sleeve unit, a silicon steel plate unit and a coil unit. The insulating sleeve unit is coupled to the silicon steel plate unit. The coil unit is wound around the insulating sleeve unit. The at least one limiting member includes another end opposite to the distal end. The other end of the at least one limiting member is interconnected to the insulating sleeve unit.

In the form shown, a deformation gap is formed between the open end of the shaft tube and an interconnection section of the other end of the at least one limiting member and the insulating sleeve unit.

In the form shown, the shaft tube includes an outer periphery having a shoulder. The stator is mounted around the outer periphery of the shaft tube and positioned at the shoulder.

In the form shown, the outer periphery of the shaft has a reduced section that forms the retaining groove.

In another form shown, the rotor includes a hub to which an end of the shaft is coupled. The at least one limiting member includes a side facing the hub of the rotor and having a dust collecting section in the form of a groove or rugged face.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
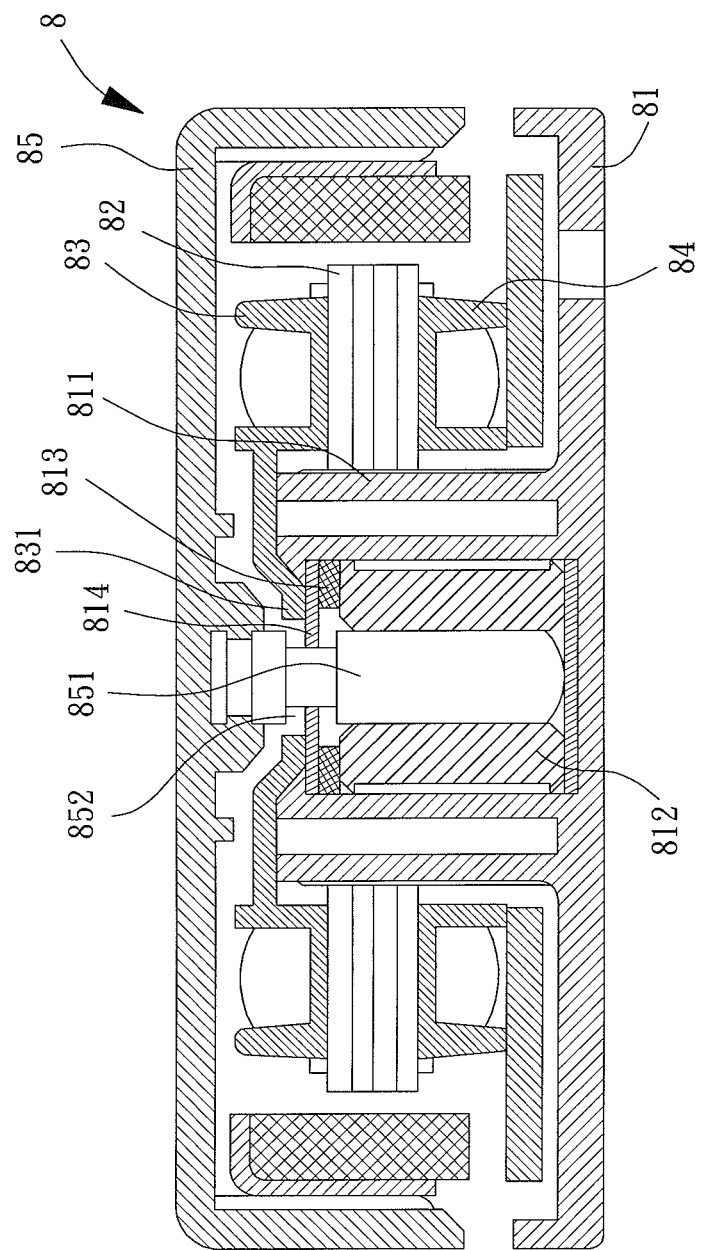
FIG. 1 shows a cross sectional view of a conventional motor.
Figure 2:
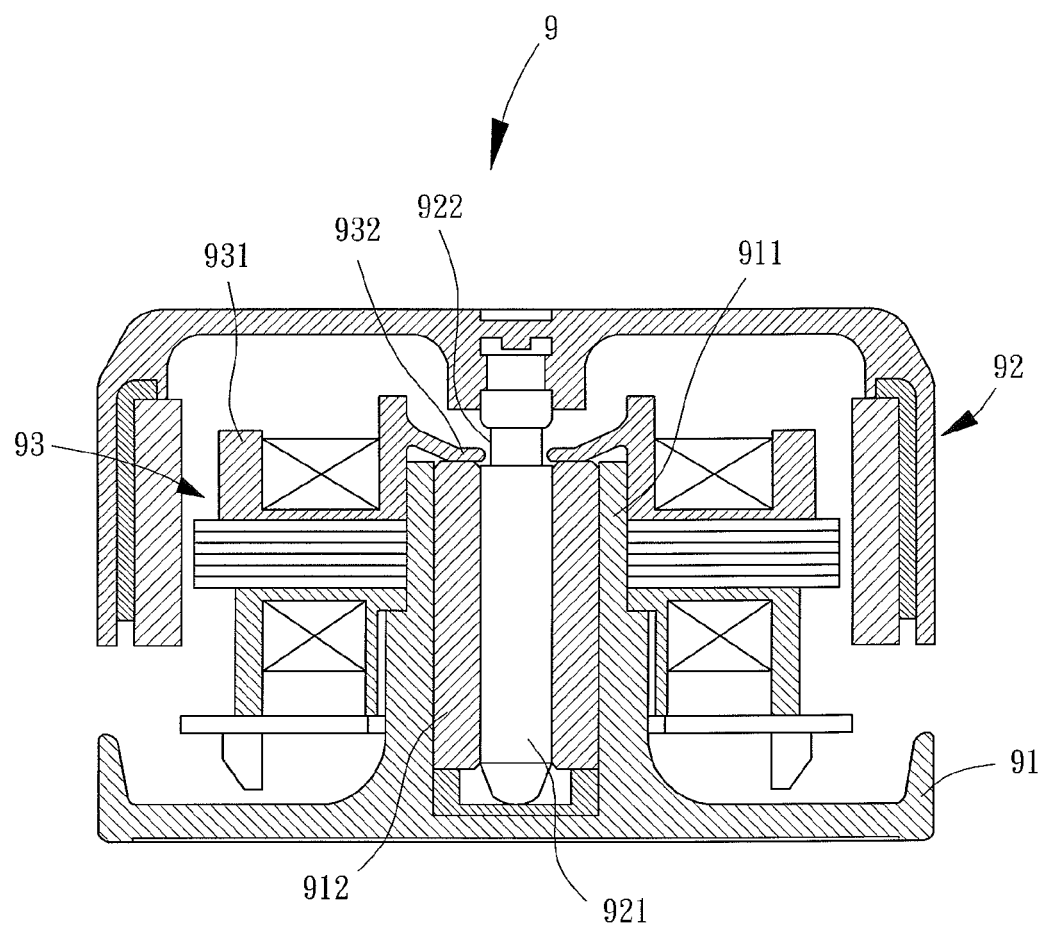
FIG. 2 shows a cross sectional view of another conventional motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "lower", "upper", "top", "bottom", "inner", "outer", "side", "end", "portion", "section", "longitudinal", "radial", "annular", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
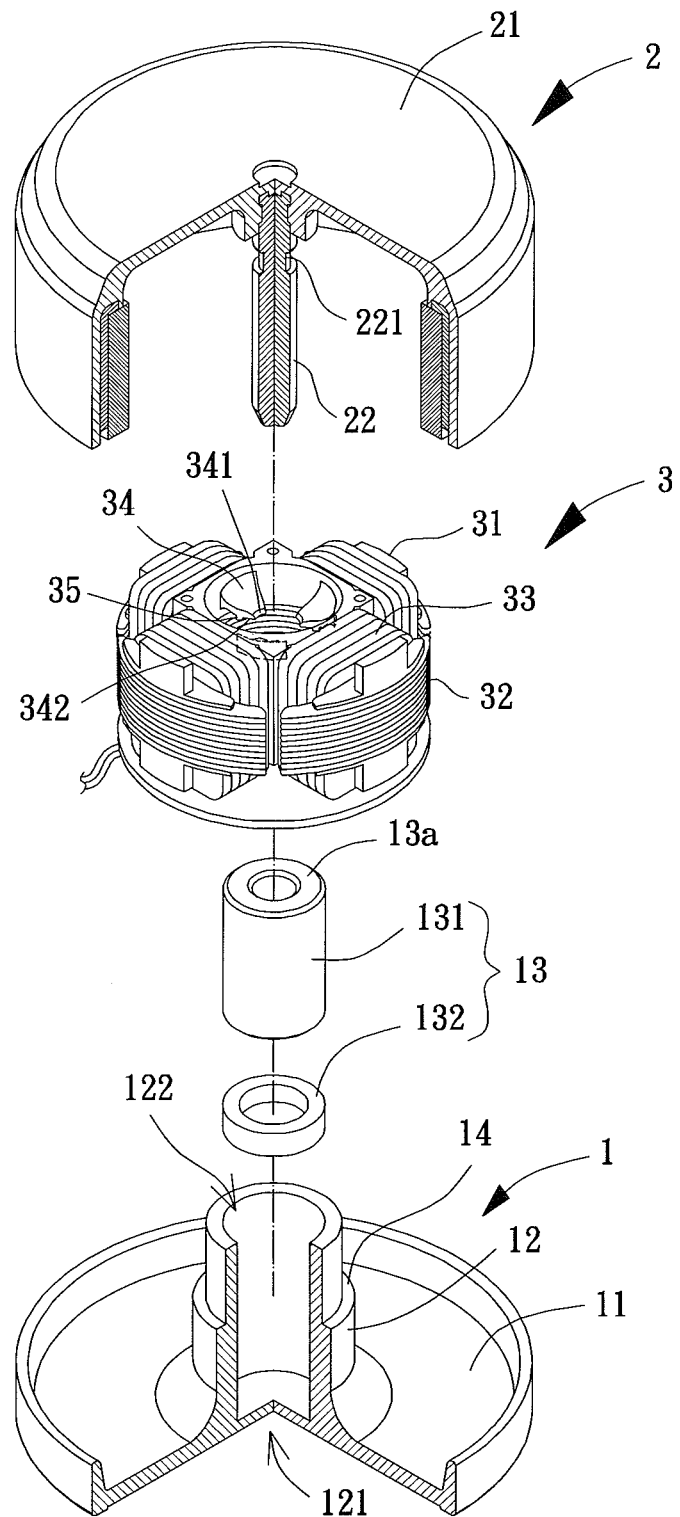
FIG. 3 shows an exploded, perspective view of a motor according to the present invention.
Figure 4:
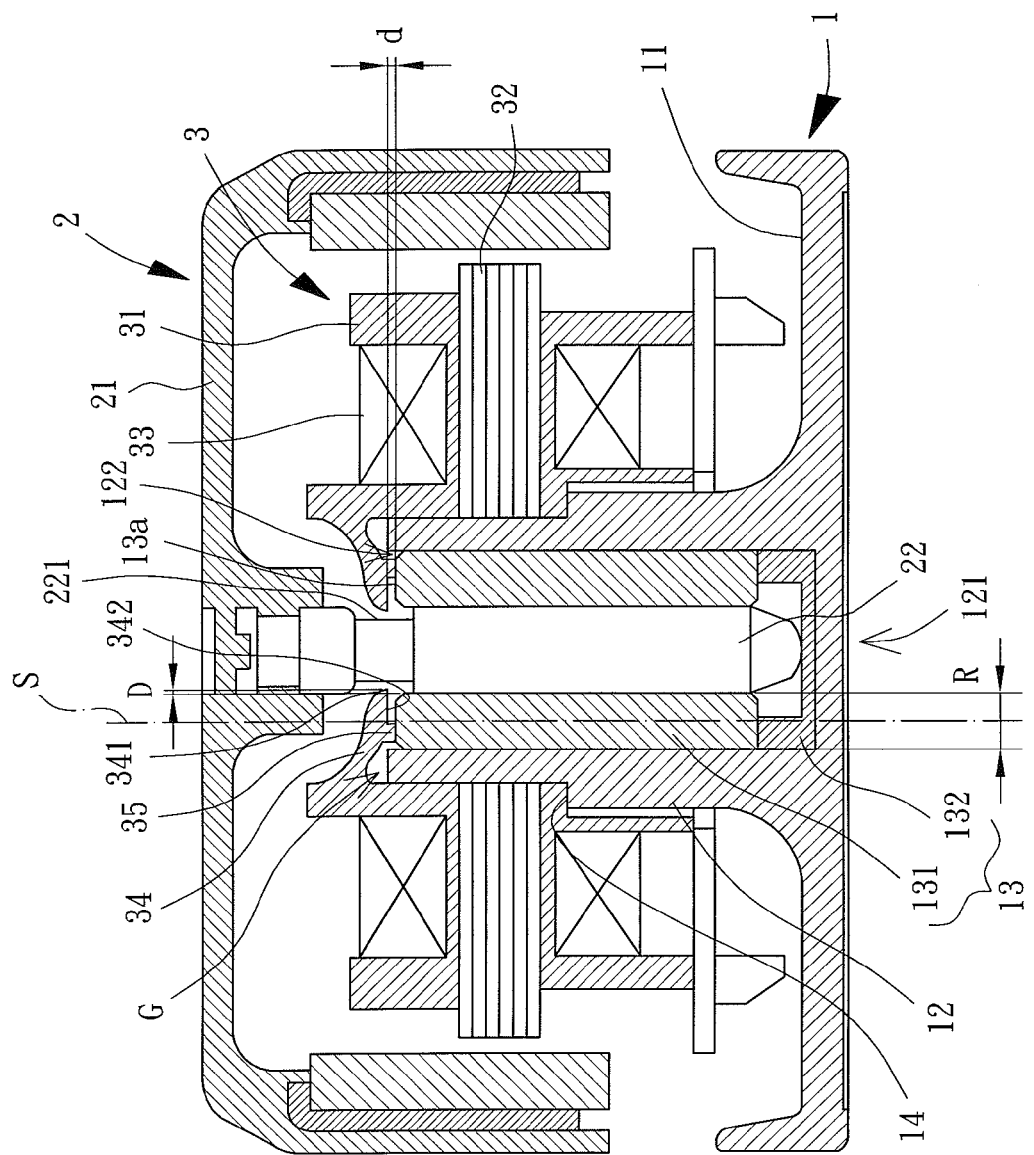
FIG. 4 shows a cross sectional view of the motor of FIG. 3.

With reference to FIGS. 3 and 4, a motor according to the present invention includes a base 1, a rotor 2 and a stator 3. The base 1 can be used as a housing of a heat dissipating fan or for other purposes. The rotor 2 is rotatably coupled to the base 1 and can be driven by the stator 3 to rotate.

The base 1 includes a base plate 11 having a shaft tube 12 in a center thereof. The shaft tube 12 includes a closed end 121 at the base plate 11 and an open end 122 opposite to the closed end 121. A shaft supporting assembly 13 is received in the shaft tube 12 and includes a top portion 13a facing the open end 122. The shaft supporting assembly 13 can include various elements for various functions, such as an abrasion-resistant plate, a bearing, an oil seal, and/or a dust preventing plate, which can be appreciated by one skilled in the art. The shaft supporting assembly 13 includes at least one bearing. In this embodiment, the shaft supporting assembly 13 includes a bearing 131 and an abrasion-resistant plate 132. The bearing 131 includes a through-hole. The abrasion-resistant plate 132 is located between the bearing 131 and the closed end 121 of the shaft tube 12. The top portion 13a of the shaft supporting assembly 13 is an end face of the bearing 131 that faces the open end 122 of the shaft tube 12. Furthermore, the shaft tube 12 includes an outer periphery having a reduced section adjacent to the open end 122 to form a shoulder 14. The stator 3 is mounted around the outer periphery of the shaft tube 12 and positioned at the shoulder 14.

The rotor 2 includes a hub 21 and a shaft 22. The hub 21 includes a plurality of vanes (not shown) on an outer periphery thereof. An end of the shaft 22 is coupled to a central area of an inner side of the hub 21. The other end of the shaft 22 is rotatably received in the through-hole of the bearing 131 and abuts the abrasion-resistant plate 132. Thus, the shaft 22 is supported by the shaft supporting assembly 13 and rotatable about a longitudinal axis. The shaft 22 includes an outer periphery having a reduced section to form a retaining groove 221. The retaining groove 221 is adjacent to the hub 21 and distant to a bottom end of the shaft 22. Thus, the portion of the outer periphery of the shaft 22 adjacent to the bottom end can also be used to be in rotational engagement with the shaft supporting assembly 13, enhancing the rotational stability of the shaft 22.

The stator 3 is coupled to the outer periphery of the shaft tube 12 and positioned at the shoulder 14. The stator 3 and the shaft tube 12 can be secured together by tight-fitting, bonding, or other suitable provisions. After the stator 3 is electrified, the rotor 2 can be driven to rotate, which can be appreciated by one skilled in the art. Specifically, the stator 3 includes an insulating sleeve unit 31, a silicon steel plate unit 32, and a coil unit 33. The insulating sleeve unit 31 is coupled to the silicon steel plate unit 32. The coil unit 33 is wound around the insulating sleeve unit 31. A stator 3 is, thus, formed. In this embodiment, the insulating sleeve unit 31 includes an upper insulating sleeve and a lower insulating sleeve, with the silicon steel plate unit 32 sandwiched between the upper and lower insulating sleeves that serve as an insulating structure between the silicon steel plate unit 32 and the coil unit 33.

Figure 5:
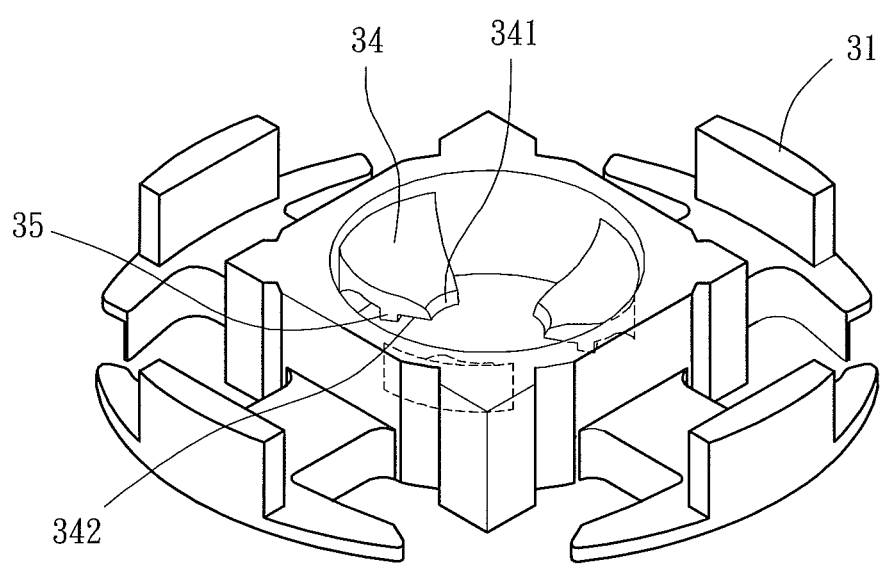
FIG. 5 shows an insulating sleeve of the motor of FIG. 3.

With reference to FIG. 5, at least one limiting member 34 is interconnected to the insulating sleeve unit 31 (by integral formation or assemblage) and includes a distal end 341 facing the shaft 22. Thus, the at least one limiting member 34 defines an opening aligned with the through-hole of the bearing 131. The at least one limiting member 34 further includes a bottom 342 facing the shaft supporting assembly 13. With reference to FIG. 4, a supporting member 35 and a gap d are formed between the bottom 342 of the at least one limiting member 34 and the top portion 13a of the shaft supporting assembly 13.

The supporting member 35 is adjacent to an inner circumferential wall of the shaft tube 12 but is distant to the outer periphery of the shaft 22. The supporting member 35 may be integrally formed on the bottom 342 of the at least one limiting member 34 or on the top portion 13a of the shaft supporting assembly 13. Alternatively, the supporting member 35 may be a detachable component that can be assembled to and disassembled from the bottom 342 of the at least one limiting member 34 or the top portion 13a of the shaft supporting assembly 13 while pressing the shaft supporting assembly 13 to prevent the shaft supporting assembly 13 from escaping from the shaft tube 12. In addition, the gap d is adjacent to the outer periphery of the shaft 22 but is distant to the inner circumferential wall of the shaft tube 12. The gap d provides a space for deformation of the at last one limiting member 34 while the shaft 22 is forcibly inserted through the opening defined by the at least one limiting member 34 along the longitudinal axis, so that the distal end 341 of the at least one limiting member 34 can more smoothly extend into the retaining groove 221 of the shaft 22 for preventing disengagement of the rotor 2.

Specifically, referring to FIG. 4, a standard that defines the supporting member 35 as being adjacent to the inner circumferential wall of the shaft tube 12 but distant to the outer periphery of the shaft 22, as well as the gap d as being adjacent to the outer periphery of the shaft 22 but distant to the inner circumferential wall of the shaft tube 12, is described as follows. First, a maximum radial distance R is defined between the outer periphery of the shaft 22 and the inner circumferential wall of the shaft tube 12 in a radial direction of the shaft 22. Then, a reference plane S parallel to the longitudinal axis and passing through a central point of the maximum radial distance R is defined. The supporting member 35 is located between the reference plane S and the inner circumferential wall of the shaft tube 12, so that only the gap d is presented between the reference plane S and the outer periphery of the shaft 22. Therefore, the gap d can provide enough space for deformation of the at least one limiting member 34, while the shaft supporting assembly 13 is still efficiently pressed by the supporting member 35, because only the gap d is presented between the reference plane S and the outer periphery of the shaft 22.

Figure 6:
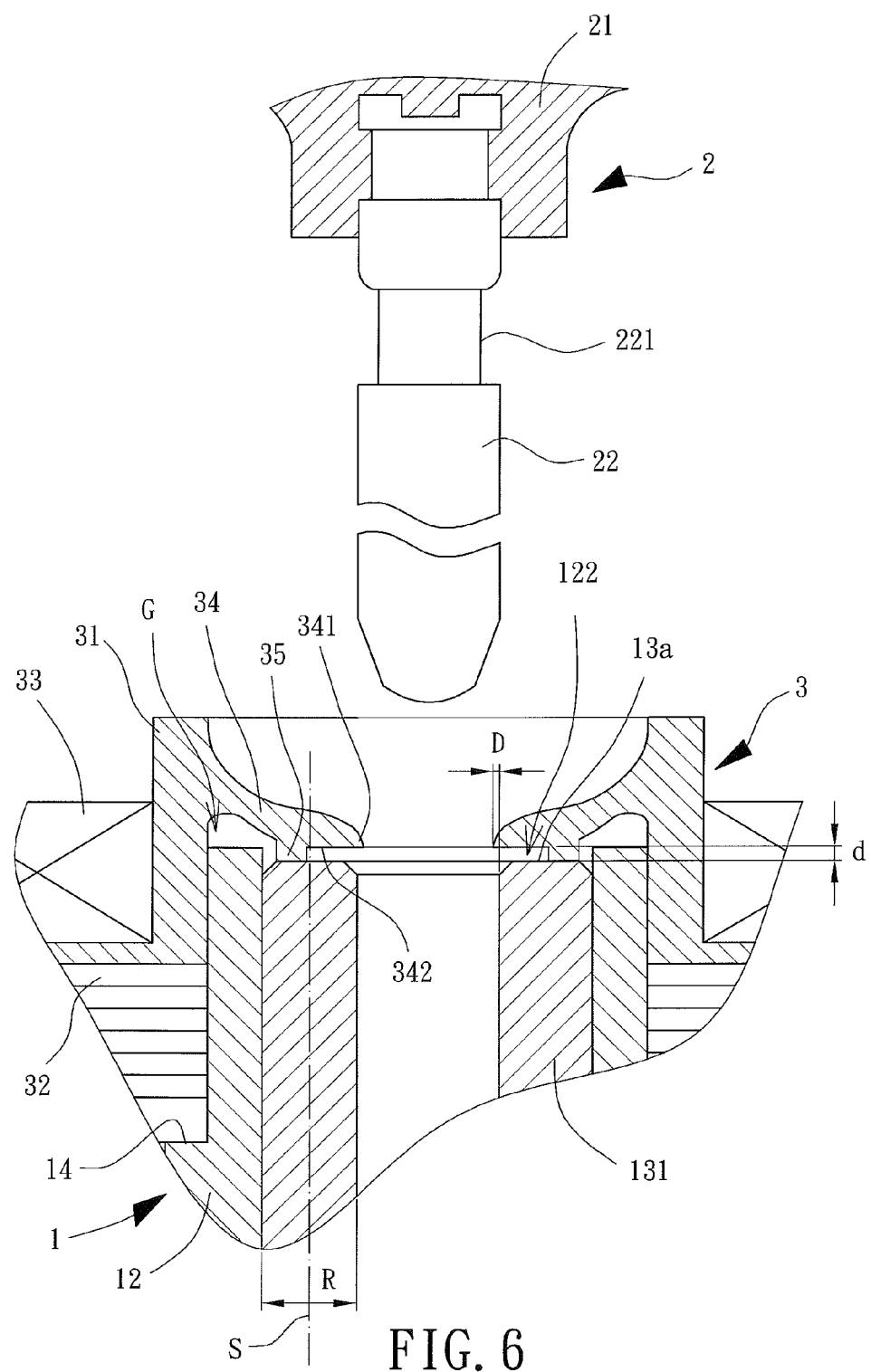
FIG. 6 is a partial, enlarged, cross-sectional, perspective view of the motor according to the present invention.
Figure 7:
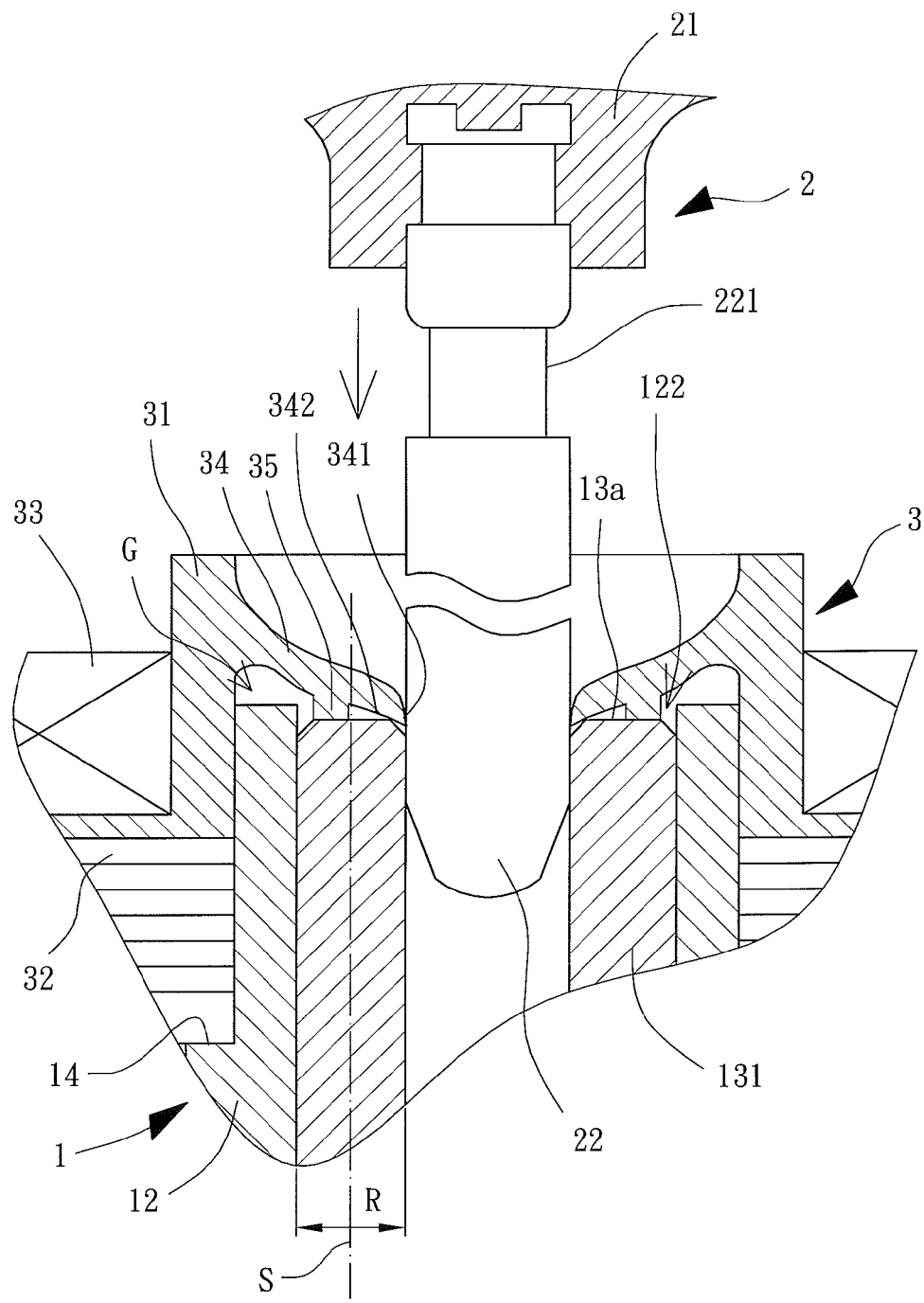
FIG. 7 is a partial, enlarged, cross-sectional, perspective view illustrating assembly of the motor according to the present invention.

With reference to FIG. 6, in assembly, the shaft supporting assembly 13 is mounted into the shaft tube 12, and the stator 3 is then mounted around the shaft tube 12, with the at least one limiting member 34 of the stator 3 extending to the open end 122 of the shaft tube 12 and with the supporting member 35 pressing against the shaft supporting assembly 13. Then, the shaft 22 of the rotor 2 is forcibly extended through the opening defined by the at least one limiting member 34, so that the shaft 22 is rotatably coupled to the shaft supporting assembly 13. With reference to FIG. 7, during insertion of the shaft 22 through the at least one limiting member 34 and since the bottom 342 of the at least one limiting member 34 is spaced from the top portion 13a of the shaft supporting assembly 13 by the gap d that provides a space for deformation of the at least one limiting member 34, the at least one limiting member 34 deforms easily while the shaft 22 is passing through the at least one limiting member 34. When the shaft 22 of the rotor 2 reaches a position in which the at least one limiting member 34 is in an axial length extent of the retaining groove 221, the at least one limiting member 34 restores its original shape and smoothly extends into the retaining groove 221 of the shaft 22. Thus, in addition to assembling convenience, damage or breakage of the at least one limiting member 34 during the assembling procedure is avoided.

By providing both the at least one limiting member 34 and the supporting member 35 on the insulating sleeve unit 31 of the stator 3, no additional element is required in the motor according to the present invention for preventing disengagement of the rotor 2, effectively simplifying the structure of the motor according to the present invention. Furthermore, although the supporting member 35 exists between the bottom 342 of the at least one limiting member 34 and the top portion 13a of the shaft supporting assembly 13, the gap d is able to provide enough space for deformation of the at least one limiting member 34 since the supporting member 35 is adjacent to the inner circumferential wall of the shaft tube 12 but distant to the outer periphery of the shaft 22, as well as since the gap d is adjacent to the outer periphery of the shaft 22 but distant to the inner circumferential wall of the shaft tube 12. As such, the at least one limiting member 34 can easily extend into the retaining groove 221 of the shaft 22 and recovers its shape thereafter, effectively preventing damage or breakage of the at least one limiting member 34 during the assembling procedure and providing enhanced assembling convenience.

With reference to FIG. 4, a radial length D is presented between the distal end 341 of the at least one limiting member 34 and an inner periphery of the through-hole of the bearing 131 in a radial direction of the shaft 22. The radial length D is smaller than or equal to the gap d along the longitudinal axis perpendicular to the radial direction. By such an arrangement, the radial length D further assures the at least one limiting member 34 will not be damaged or broken during assembly, while using the gap d as a space for deformation of the at least one limiting member 34.

With reference to FIG. 4, the other end of the at least one limiting member 34 opposite to the distal end 341 is interconnected to the insulating sleeve unit 31. A deformation gap G is formed between the open end 122 of the shaft tube 12 and an interconnection section of the other end of the at least one limiting member 34 and the insulating sleeve unit 31. Thus, when the shaft 22 of the rotor 2 is forcibly inserted through the opening defined by the at least one limiting member 34, the deformation gap G provides a space sufficient for downward and inclined deformation of the at least one limiting member 34 without coming in contact with the open end 122 of the shaft tube 12.

Figure 8:
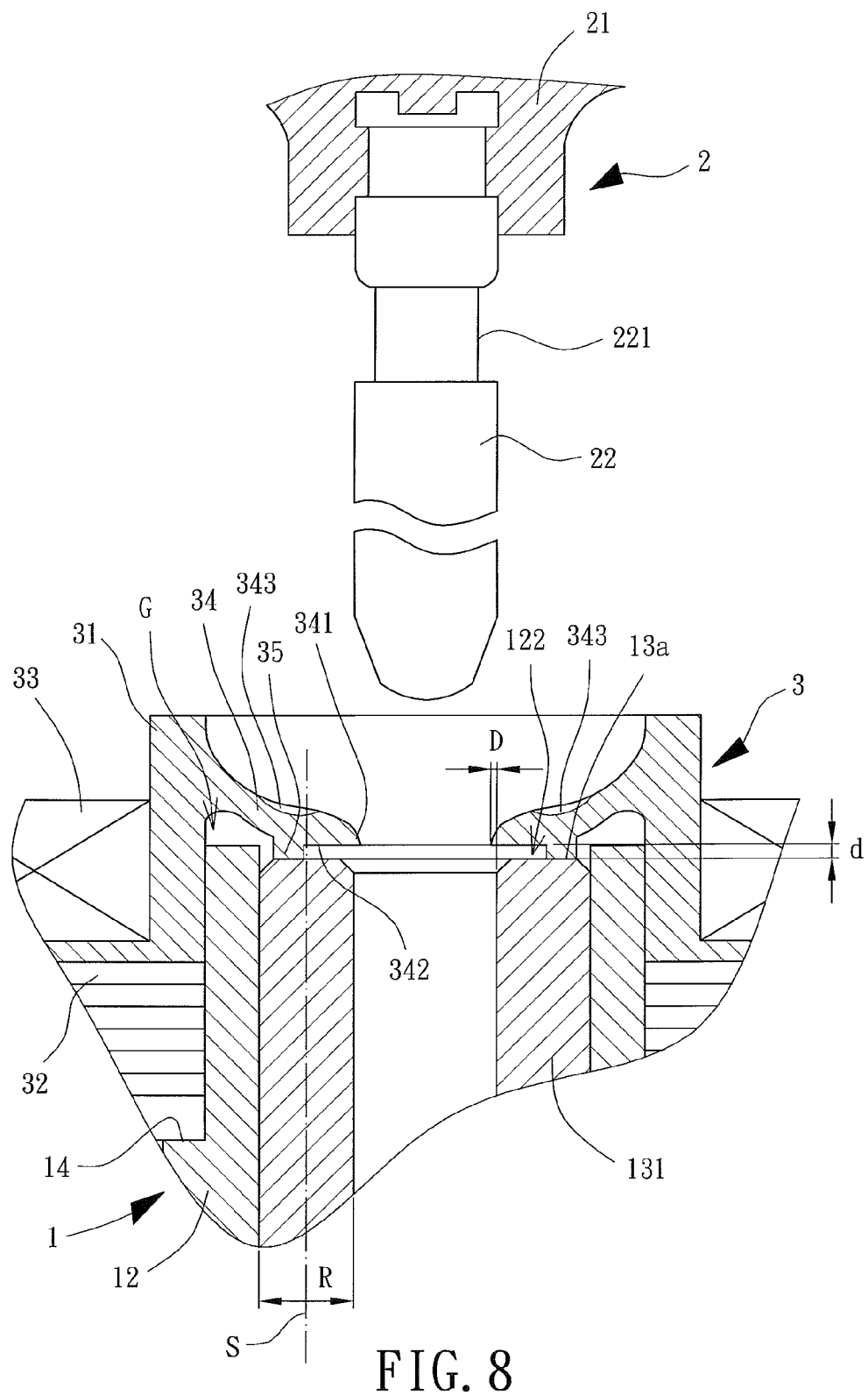
FIG. 8 is a view similar to FIG. 6, illustrating another example of the limiting members of the motor according to the present invention.

With reference to FIG. 8, the at least one limiting member 34 includes a side facing the hub 21. The side of the at least one limiting member 34 includes a dust collecting section 343 in the form of a groove or rugged face. The dust collecting section 343 can collect dust to prevent dust from entering the shaft tube 12.

In view of the foregoing, the at least one limiting member 34 is directly provided on the insulating sleeve unit 31 of the stator 3 and may be used with the supporting member 35 to prevent disengagement of the rotor 2, effectively simplifying the structure of the motor according to the present invention while allowing easy formation of the mold and allowing mass production. The manufacturing costs of the motor according to the present invention can, thus, be cut.

Furthermore, the motor of the invention may form the gap d between the bottom 342 of the at least one limiting member 34 and the top portion 13a of the shaft supporting assembly 13, providing enough space for deformation of the at least one limiting member 34 and enhancing assembling convenience.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor comprising:
   a base including a shaft tube, with the shaft tube including an open end and a closed end, with a shaft supporting assembly received in the shaft tube and including a top portion facing the open end;
   a rotor including a shaft supported by the shaft supporting assembly and rotatable about a longitudinal axis, with the shaft including a retaining groove, with the rotor including a hub to which an end of the shaft is coupled; and
   a stator coupled to the shaft tube of the base, with the stator including at least one limiting member having a distal end facing the shaft, with the at least one limiting member defining an opening through which the shaft extends to engage with the shaft supporting assembly, with the distal end of the at least one limiting member received in the retaining groove of the shaft and preventing disengagement of the shaft from the shaft supporting assembly, with the at least one limiting member further including a bottom facing the shaft supporting assembly, with a gap and a supporting member formed between the bottom of the at least one limiting member and the top portion of the shaft supporting assembly, with the supporting member being closer to the shaft tube than to the shaft, with the gap being closer to the shaft than to the shaft tube, with the gap providing a space for deformation of the at last one limiting member, wherein the distal end of the at least one limiting member extends into the retaining groove of the shaft, and wherein the at least one limiting member has an axial thickness gradually reducing from the supporting member to the distal end thereof, with the at least one limiting member including a side facing the hub of the rotor and having a dust collecting section, and with the dust collecting section being a groove or rugged face.

2. The motor as claimed in claim 1, with a maximum radial distance defined between an outer periphery of the shaft and an inner circumferential wall of the shaft tube in a radial direction of the shaft, with a reference plane defined as being parallel to the longitudinal axis and passing through a central point of the maximum radial distance, with the supporting member located between the reference plane and the inner circumferential wall of the shaft tube, with only the gap presented between the reference plane and the outer periphery of the shaft.

3. The motor as claimed in claim 1, with the supporting member integrally formed on the bottom of the at least one limiting member.

4. The motor as claimed in claim 1, with the supporting member integrally formed on the top portion of the shaft supporting assembly.

5. The motor as claimed in claim 1, with the supporting member being a detachable component capable of being assembled to and disassembled from the bottom of the at least one limiting member or the top portion of the shaft supporting assembly.

6. The motor as claimed in claim 1, with the shaft supporting assembly including a bearing having a through-hole, with the shaft of the rotor rotatably received in the through-hole of the bearing, with the top portion of the shaft supporting assembly being an end face of the bearing that faces the open end of the shaft tube.

7. The motor as claimed in claim 6, with a radial length presented between the distal end of the at least one limiting member and an inner periphery of the through-hole of the bearing in a radial direction of the shaft perpendicular to the longitudinal axis, with the radial length smaller than or equal to the gap along the longitudinal axis.

8. The motor as claimed in claim 1, with the stator including an insulating sleeve unit, a silicon steel plate unit and a coil unit, with the insulating sleeve unit coupled to the silicon steel plate unit, with the coil unit wound around the insulating sleeve unit, with the at least one limiting member including an other end opposite to the distal end, with the other end of the at least one limiting member interconnected to the insulating sleeve unit.

9. The motor as claimed in claim 8, with a deformation gap formed between the open end of the shaft tube and an interconnection section of the other end of the at least one limiting member and the insulating sleeve unit.

10. The motor as claimed in claim 1, with the shaft tube including an outer periphery having a shoulder, with the stator mounted around the outer periphery of the shaft tube and positioned at the shoulder.

11. The motor as claimed in claim 1, with the outer periphery of the shaft having a reduced section, with the reduced section forming the retaining groove.

12. The motor as claimed in claim 1, with the dust collecting section being the groove in the side of the limiting member facing the hub of the rotor.

* * * * *